(12) United States Patent
Nguyen et al.

(10) Patent No.: US 6,183,702 B1
(45) Date of Patent: Feb. 6, 2001

(54) FLUID DISTRIBUTOR ASSEMBLY FOR A MULTI-BED, DOWNFLOW CATALYTIC REACTOR

(75) Inventors: Duyen T. Nguyen, Castro Valley; Krishniah Parimi, Concord; Dennis R. Cash, Novato, all of CA (US)

(73) Assignee: Chevron U.S.A. Inc., San Francisco, CA (US)

(*) Notice: Under 35 U.S.C. 154(b), the term of this patent shall be extended for 0 days.

(21) Appl. No.: 09/218,801

(22) Filed: Dec. 21, 1998

(51) Int. Cl.$^7$ ................................. B01J 8/04; B01J 8/02
(52) U.S. Cl. .................... 422/194; 422/195; 422/191; 422/220; 422/224; 261/114.5
(58) Field of Search .................... 422/191, 194, 422/195, 220, 224; 261/114.1, 114.2, 114.3, 114.4, 114.5, 113, 21, 97

(56) References Cited

U.S. PATENT DOCUMENTS

| | | | |
|---|---|---|---|
| 2,893,713 | * 7/1959 | Haltmeier | 261/114.2 |
| 3,353,924 | * 11/1967 | Riopelle | 422/191 |
| 3,705,016 | 12/1972 | Ludwigsen et al. | 422/191 |
| 3,977,834 | 8/1976 | Alcock et al. | 422/191 |
| 4,182,741 | 1/1980 | Carson et al. | 422/211 |
| 4,238,426 | 12/1980 | Slobodyanik | 261/114.3 |
| 4,836,989 | 6/1989 | Aly et al. | 422/195 |
| 4,960,571 | 10/1990 | Bhagat et al. | 422/194 |
| 5,152,967 | * 10/1992 | Rossetti et al. | 422/194 |
| 5,403,560 | 4/1995 | Deshpande et al. | 422/190 |
| 5,567,396 | * 10/1996 | Perry et al. | 422/190 |
| 5,690,896 | 11/1997 | Stangeland et al. | 422/191 |

* cited by examiner

Primary Examiner—Shrive Beck
Assistant Examiner—Susan Ohorodnik

(74) Attorney, Agent, or Firm—Timothy J. Hadlock; David S. Bradin

(57) ABSTRACT

A distributor assembly for a multi-bed, downflow catalytic reactor is disclosed. The distributor assembly is configured for disposal and fixable attachment between the inner surfaces of the walls of a multi-bed downflow cylindrical reactor wall and for disposal between vertically stacked catalyst beds within the reactor. The assembly includes:

(a) a collection plate configured for substantially horizontal disposal between the walls of a cylindrical reactor;

(b) a plurality of generally arc-shaped elongated baffles disposed in a staggered, substantially symmetrical pattern about the collection plate;

(c) a first mixing zone configured to be bounded on the bottom by the collection plate, on one side by a wall of a cylindrical reactor, and on the opposite side by the outer surface of the elongated baffles;

(d) a cylindrical weir fixably attached to the collection plate about the outlet;

(e) a second mixing zone bounded on the bottom by the collection plate, on one side by the outer surface of the cap and the first cylindrical weir, and on the opposite side by the inner surface of the elongated baffles;

(f) a cap disposed over and about the first cylindrical weir, thereby forming a third mixing zone, plurality of semi-spiral-shaped baffles disposed in the third mixing zone, the semi-spiral-shape;

(g) baffles having an elongated shape, having one lateral edge fixed to an inner surface of the cap or an opposite lateral edge fixed to an outer surface of the first cylindrical weir;

(h) a substantially doughnut-shaped screen member disposed over a top portion of the cylindrical weir;

(i) a plurality of fourth-mixing-zone baffles fixably attached to a top surface of the doughnut-shaped screen member; and (j) a plurality of quench gas ports disposed in the second mixing zone.

25 Claims, 5 Drawing Sheets

FLUID DISTRIBUTOR ASSEMBLY FOR A MULTI-BED, DOWNFLOW CATALYTIC REACTOR

I. FIELD OF THE INVENTION

This invention relates to a distributor assembly for multi-bed, down-flow catalytic reactors, that is, reactors which include vertically superimposed packed beds of particulate catalytic material and where a liquid or liquid and gas mixture is processed as it flows down through the packed beds. This type of reactor is used in the petroleum and chemical processing industries for carrying out various catalytic reactions, such as hydrotreating, hydrofinishing, hydrocracking, and dewaxing.

II. BACKGROUND OF THE INVENTION

Multi-bed, down-flow catalytic reactors are used in the petroleum and chemical industries for a variety of processes. In the petroleum refining industry, multi-bed, down-flow reactors are used in processes for hydrotreating, hydrodesulfurization, hydrofinishing, hydrocracking, and dewaxing. In these processes, the process liquid is mixed with a gas or vapor and this multiple phase mixture is passed through the packed catalyst beds. In exothermic reactions, large amounts of heat may be generated in the catalyst beds. Quench media may be added to regulate the temperature in the reactor. Typically, the quench media is also a reactant, e.g., hydrogen. As the liquid and gas mixture flows through a catalyst bed, some maldistribution of temperature and reactant concentration often develops across each bed. Unless this is mitigated, the reactor operation would be inefficient and hot spots may develop that could potentially shorten catalyst life and force premature reactor shutdown and therefore plant shutdown. It is, therefore, necessary to provide reactor internals for collecting and mixing the liquid and gas exiting from one bed before distribution to the next bed, so that any such maldistribution is not propagated from one catalyst bed to the next. To accomplish this, distributor assemblies are used between the catalyst beds to ensure that the distribution of the liquid and gas mixture (and as the case may be, the vaporous reactant or quench gas) across each bed is as uniform as possible in both composition and temperature. To make the corrections of temperature and concentration maldistributions, the distributor assembly should provide for good liquid-liquid, gas-gas, and gas-liquid mixing. In addition to providing good mixing, it is desirable that the distributor assembly be compact and impose only a low pressure drop.

By providing such uniform distribution, each bed will be efficiently utilized and the desired catalytic reactions will take place in a more predictable manner. Numerous types of distributor assemblies for multi-bed, down-flow reactors are known in the prior art. One example is shown in U.S. Pat. No. 4,836,989, in which the distributor assembly includes a collector tray arranged below a catalyst bed and a distributor tray is mounted under the collector tray. The distributor tray is fed by spillways which provide passageways for the liquid collected on the collector tray, as well as quench gas injected between the distributor tray and the catalyst bed. The spillways have outlets below the collector tray which face sideways and tangentially into an annular second mixing zone located under the collector tray. This second mixing zone has a high liquid holdup. The outlets are described as imparting a swirling motion to the liquid in the annular second mixing zone that promotes good mixing and temperature equilibrium. Further mixing and redistribution apparatus is provided below the second mixing zone to collect and distribute liquid over the underlying catalyst bed. The design also requires a high pressure drop to be effective.

Another type of a distributor assembly, as shown in U.S. Pat. No. 4,960,571, includes a collector plate that has a central opening therein. A quench mixing zone is provided under the collector plate, in which a second plate having openings formed in an annular outer portion thereof is mounted under the collector plate, with the annular portion thereof being situated radially outwardly of the central opening in the collector plate. Baffles are affixed to the annular portion and arranged at a tangential angles and in concentric rings to induce current eddies in the liquid and gas flowing through the annular portion. The design does not provide as extensive radial mixing as is usually desirable.

Another distributor assembly for multi-bed, down-flow reactors is described in U.S. Pat. No. 5,690,896 ('896 patent). The '896 patent teaches a mixing box arrangement were all fluid collected on a tray flow in a spiral pattern to a single mixing zone leading to a single outlet. This design has drawbacks in that the degree of correction of temperature and composition distributions may depend upon the origin of the distribution relative to the single opening to the mixing zone. Also, because of the single opening and mixing zone, the required height of the assembly could be high in order to accommodate a sufficient liquid throughput. The design also requires a high pressure drop to be effective.

Examples of other types of distributor assemblies for multi-bed, down-flow reactors are described in U.S. Pat. Nos. 3,705,016, 3,977,834, and 4,182,741. It would be advantageous to have a distribution assembly that overcame the deficiencies of known designs. The distributor assembly of the invention provides this improved design.

III. SUMMARY OF THE INVENTION

The invention, in one embodiment, is a distributor assembly for a multi-bed, downflow catalytic reactor including: a collection plate configured for substantially horizontally disposal between the walls of a cylindrical reactor, configured for collecting liquid flowing down from a higher catalyst bed contained in the reactor. The collection plate having of an outlet in a center portion thereof configured for allowing a passageway for liquid and gas from the higher catalyst bed to flow toward a lower catalyst bed contained in the reactor.

A plurality of generally arc-shaped elongated baffles: disposed in a staggered, substantially symmetrical pattern about the collection plate, each baffle having a bottom edge portion fixably attached to the collection plate and a top edge portion extending substantially vertically upward to a height sufficient to substantially prevent liquid flowing over the top edge portion. Each baffle having a head portion proximal to perimeter portions of the collection plate and having an opposite tail portion proximal to a center portion of the collection plate, wherein the head portion of each of the elongated baffles overlaps a tail portion of another of the elongated baffles.

The elongated baffles configured for directing the liquid from an outer portion of the collection plate toward a center portion of the collection plate and configured to cause mixing between liquid passing out of the tail portion of each elongated baffle with the liquid passing into the head portion of the adjacent overlapping elongated baffle. A first mixing zone configured to be bounded on the bottom by the collection plate, on one side by a wall of the cylindrical reactor, on the opposite side by the outer surface of the elongated baffles.

A cylindrical weir fixably attached to the collection plate about the outlet, configured for causing the liquid and gas to rise up and over the first cylindrical weir before flowing through the outlet toward the lower catalyst bed. A second mixing zone: bounded on the bottom by the collection plate, on one side by the outer surface of the cap and the first cylindrical weir, and on the opposite side by the inner surface of the elongated baffles; having a plurality of entrances bound on one side by the interior surface of a head portion of one elongated baffle and on an opposite side by the outer surface of a tail portion of an overlapping elongated baffle. Optionally, a plurality of quench gas ports is disposed in the second mixing zone; each port having an outlet disposed proximal to the collecting collection plate and configured for ejecting a quench gas beneath the surface of a liquid collected in the second mixing zone and towards the tail portion of each of the generally arc-shaped elongated baffles. The entrances to the second mixing zone form passageways configured to permit the liquid to flow from the first mixing zone to the second mixing zone.

A cap, typically cylindrical, having a diameter larger than the first cylindrical weir, is disposed over and about the first cylindrical weir, disposed so the top of the cap is above the top edge of the first cylindrical weir, thus providing a passage way, and the bottom edge of the cap is above the collection plate, thus providing a passageway: thereby forming a third mixing zone, including an annular passageway between the outer surface of the first cylindrical weir and the inner surface of the cap. The cap having a plurality of slots substantially symmetrically disposed about the circumference of its open end; beginning at a lower extremity and disposed substantially vertically up a portion of the cap; configured for allowing passage of gas and liquid from the second mixing zone to the third mixing zone.

A plurality of semi-spiral-shaped baffles are optionally fixably disposed in the third mixing zone, the semi-spiral-shaped baffles having an elongated shape. Each semi-spiral-shaped baffle optionally has one lateral edge fixed to an inner surface of the cap, or alternatively an opposite lateral edge fixed to an outer surface of the first cylindrical weir, or utilizes any other conventional attachment method, and having one longitudinal end disposed proximal to a bottom portion of the first cylindrical weir but above a top portion of the slots in the cap; and having an opposite longitudinal end disposed proximal to a top portion of the first cylindrical weir, configured for causing the liquid and gas in the third mixing zone to move laterally and for causing further mixing of the liquid and gas.

A substantially doughnut-shaped screen member, typically a thin or flattened shape as to thickness but maintaining roundness along the inner and outer circumferences, disposed over a top portion of the cylindrical weir, configured for causing further liquid-liquid mixing and for causing separation of the liquid and the gas. A fourth mixing zone has an annular shape and is bounded on the top by the inner top surface of the cap, on the bottom by the substantially doughnut-shaped screen member, and has the width of the inner and outer diameters of the doughnut-shaped screen member. A plurality of baffles ("fourth-mixing-zone baffles") are optionally fixably attached to a top surface of the doughnut-shaped screen member, configured for diverting the liquid and the gas, and for causing further mixing of the liquid and gas.

The distributor assembly is configured for disposal and fixable attachment between inner surfaces of the walls of a multi-bed down-flow cylindrical reactor wall and for disposal between vertically stacked catalyst beds within the reactor. These and other features of the present invention will be more readily understood upon reading the following "Detailed Description of the Preferred Embodiment" in conjunction with the accompanying drawings.

IV. BRIEF DESCRIPTION OF THE DRAWINGS

V. DETAILED DESCRIPTION OF THE PREFERRED EMBODIMENT

A. Elements

The elements for the assembly and corresponding reference numbers as used in the figures are listed in Table 1 below. In the section following this one, each element and how it relates to the other elements is described in detail with reference to the figures.

TABLE 1

| Element Name | Element Number Used In Figures |
| --- | --- |
| Reactor | 1100 |
| Reactor Side Wall | 1105 |
| First Mounting Means | 1106 |
| Catalyst Beds | 1107, 1108 |
| Bubble Cap Tray Assembly | 1110 |
| Perforated Plate | 1115 |
| Second Mounting Means | 1117 |
| Distributor Assembly | 1120 |
| Collection plate | 1125 |
| Generally Arc-Shaped Elongated Baffles | 1130 |
| Quench Gas Ports | 1140 |
| Cap | 1150 |
| Semi-Spiral-Shaped Baffles | 1155 |
| Fourth-mixing-zone baffles | 1160 |
| First Cylindrical Weir | 1165 |
| Doughnut-shaped Screen Member | 1170 |
| Second Cylindrical Weir | 1175 |
| First Mixing Zone | 1180 |
| Second Mixing Zone | 1185 |
| Third Mixing Zone | 1187 |
| Fourth Mixing Zone | 1188 |
| Fifth Mixing Zone | 1189 |
| Inlet Passage Ways | 1195 |

B. Organization Of Elements Of The Distributor Assembly For A Catalytic Reactor

Figure 1:
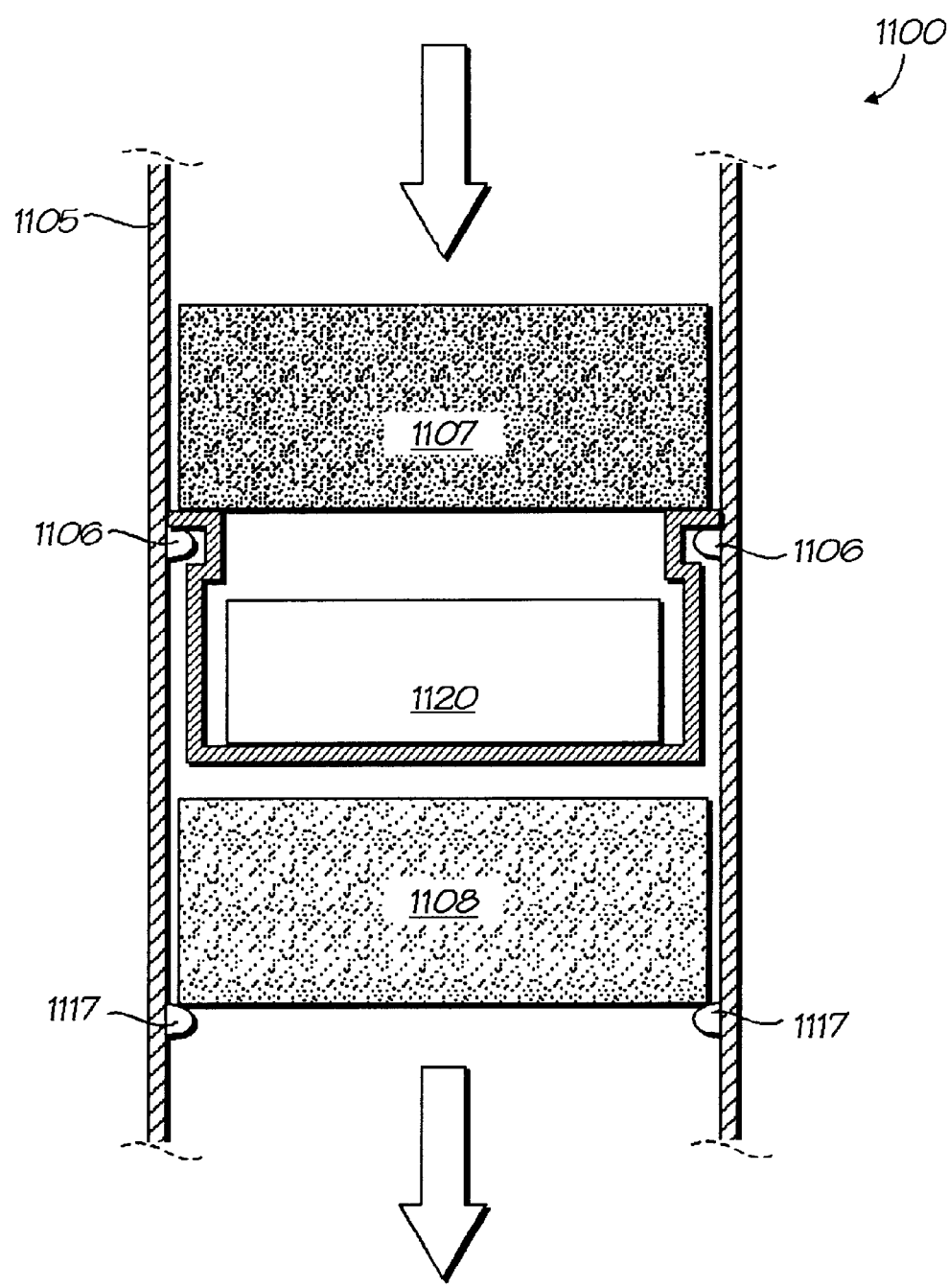
FIG. 1 is a schematic, perspective isometric view of a preferred embodiment of the distributor assembly in the context of a reactor vessel according to the present invention.

FIG. 1 depicts an overview schematic cut-away view of a multi-bed, down-flow reactor 1100 with the distributor assembly of the invention included therein. It has a cylindrical reactor wall 1105 and a first mounting means 1106 fixably attached to the cylindrical reactor wall 1105. Reactor 1100 is configured for supporting catalyst beds 1107–1108 containing packed particulate catalytic material (not shown) in vertically superimposed relation to each other to permit liquid and gas to flow from a higher catalyst bed 1107 to a lower catalyst bed 1108. A typical first mounting means 1106 optionally includes a strut member fixably attached to the reactor wall 1105, typically welded, and optionally a grid screen assembly (not shown) including a support grid, space cloth and wire screen, all of which are well known in the art, for supporting the catalyst in the higher catalyst bed. The grid screen assembly is typically mounted on parallel cross beams (not shown) or other strut members that are horizontally mounted to the reactor wall 1105. Mounting means 1106 supports the higher catalyst bed from the bottom of the bed 1107. Distributor assembly 1120 is optionally supported in a "basket" hanging from and below the same mounting means 1106. Lower catalyst bed 1108 is below the distributor assembly 1120 and is supported by additional mounting means 1117.

The distributor assembly 1120 of the present invention is mounted to the reactor wall 1105 under the grid screen assembly (not shown) to receive liquid and gas flowing down from the entire bottom surface of the overlying/higher catalyst bed 1107 and to mix the liquid and gas. Two or more catalyst beds fixably attached to the first mounting means and disposed between inner surfaces of the cylindrical reactor wall.

An optional second mounting means 1117 is fixably attached to the cylindrical reactor wall and configured for supporting distributor assembly 1120. Any other conventional mounting/support means may be used for positioning the catalyst beds and distributor assemblies in the reactor. For example, a catalyst bed can be supported from the bottom by mounting means attached to the bottom of the catalyst bed and the reactor. The distributor assembly below that catalyst bed can rest in a "basket" hanging down from the same mounting means. Generally, it is desirable to have fewer weld points to the reactor wall. Distributor assembly 1120 is fixably attached to either the first or second mounting means, 1106 or 1117, respectively, and disposed between inner surfaces of the cylindrical reactor wall 1105 and between the catalyst beds 1107–1108.

Figure 2:
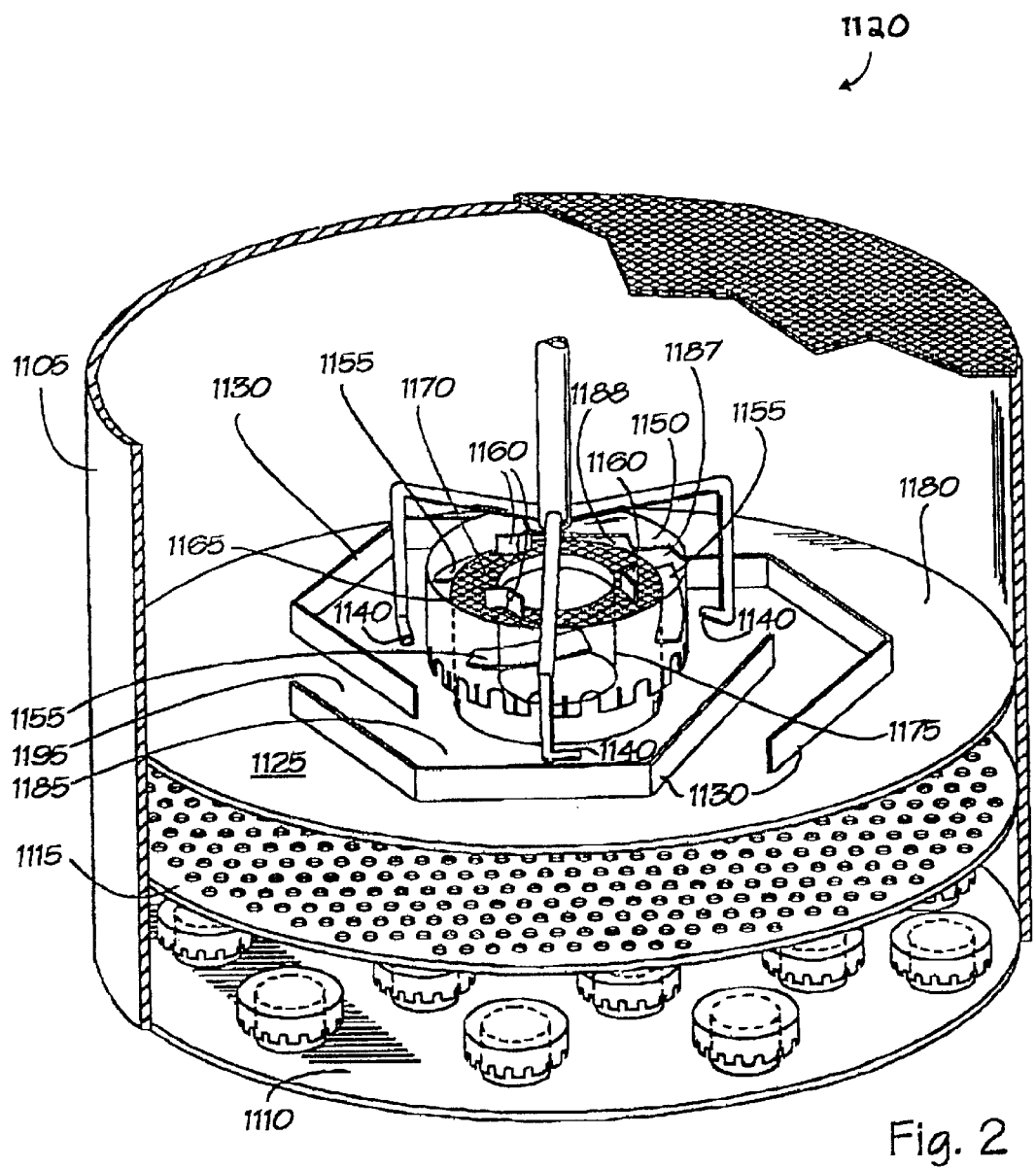
FIG. 2 is a schematic, perspective isometric cut-away view of a preferred embodiment of the distributor assembly according to the present invention.

The section shown in FIG. 2 is an isometric detail view of the distributor assembly 1120. The distributor assembly 1120 distributes the mixture of liquid and gas received from higher catalyst bed 1107 to a perforated plate 1115. Perforated plate 1115 mounted below the distributor assembly 1120, in turn, distributes the liquid and gas, as well as quench gas, over the cross section of the reactor to a bubble cap tray assembly 1110 which is mounted under the perforated plate 1115. A conventional bubble cap tray assembly 1110 is mounted below a conventional perforated plate 1115 and is configured to further mix the liquid and gas, as well as any quench gas, and to distribute the resultant liquid-gas mixture across the upper surface of an underlying/lower catalyst bed 1108.

The distributor assembly 1120 includes a collection plate 1125 disposed substantially horizontally between the cylindrical reactor wall 1105. It is configured for collecting liquid flowing down from the higher catalyst bed 1107. The collection plate 1125 has an outlet in a center portion thereof configured for allowing a passageway for liquid and gas from the higher catalyst bed 1107 to flow toward the lower catalyst bed 1108.

A key element of the distributor assembly is a plurality of generally arc-shaped elongated baffles 1130. They are disposed in a staggered, substantially symmetrical pattern about the collection plate. The number of baffles is sufficient to increase mixing in mixing zone 1 and zone 2 and aid flow from mixing zone 1 to mixing zone 2. In one embodiment, the number is from about 2 to about 6. Each baffle 1130 has a bottom edge portion fixably attached to the collection plate 1125 and a top edge portion extending substantially vertically upward to a height sufficient to substantially prevent liquid flowing over the top edge portion, but sufficiently short to minimize overall height of the distributor assembly.

Each baffle 1130 has a head portion proximal to the cylindrical reactor wall 1105 and has and an opposite tail portion proximal to a center portion of the collection plate 1125. The baffles 1130 are thus configured so the head portion of each of the elongated baffles overlaps a tail portion of another of the elongated baffles. The head portion is sufficiently close to the perimeter and sufficiently far from the perimeter to increase mixing in mixing zone 1 and mixing zone 2. In one embodiment, the head portion of each baffle proximal to perimeter portions of the collection plate is a distance of from about 5% to about 40% of the radius of the collection plate to the perimeter of the collection plate. The tail portion is sufficiently close to the center and sufficiently far from the center to increase mixing in mixing zone 2 and mixing zone 3 and flow through mixing zone 3. In one embodiment, the opposite tail portion proximal to a center portion of the collection plate is a distance of from about 5% to about 40% of the radius of the collection plate to the center of the collection plate.

The elongated baffles 1130 are configured for directing the liquid from an outer portion of the collection plate 1125 toward a center portion of the collection plate 1125 and configured to cause mixing between liquid passing out of the tail portion of each elongated baffle with the liquid passing into the head portion of the adjacent overlapping elongated baffle.

There is a first mixing zone 1180 having a bottom wall formed by a flat circular bottom wall or collection plate 1125, defined on one side by an upright, cylindrical, peripheral reactor wall 1105, defined on the opposite side by the outer surface of the generally arc-shaped elongated baffles 1130. The first mixing zone 1180 is configured to collect liquid flowing down from the overlying catalyst bed 1107 and mix the liquid prior to reaching the inlet passageways 1195 of second mixing zone 1185, described below.

A first cylindrical weir 1165 is fixably attached to the collection plate 1125 about the outlet and is configured for causing the liquid and gas to rise up and over the first cylindrical weir before flowing through the outlet toward the lower catalyst bed.

The distributor assembly 1120 further includes a second mixing zone 1185 bounded on the bottom by the collection plate 1125, on one side by the outer surface of the cap 1150 and, optionally, the first cylindrical weir 1165, and on the opposite side by the inner surface of the elongated baffles 1130, typically mounted in substantially fluid-tight relation to the upper surface of the collection plate. That is, the bottom wall of the first mixing zone 1180 and the bottom wall of second mixing zone 1185 are both formed by the collection plate 1125, and thus both lay in the same horizontal plane. A plurality of quench gas ports 1140 are disposed in the second mixing zone; each port 1140 having an outlet (not shown separately) disposed proximal to the collecting collection plate 1125 and configured for ejecting a quench gas beneath the surface of a liquid collected in the second mixing zone 1185 and towards the tail portion of each of the generally arc-shaped elongated baffles 1130. The number of quench gas ports is sufficient to increase mixing in mixing zone 2 and flow from mixing zone 2 to mixing zone 3. In one embodiment, the number is from about 2 to about 6.

The second mixing zone 1185 has a plurality of entrances 1195 bound on one side by the interior surface of a head portion of one elongated baffle and on an opposite side by the outer surface of a tail portion of an overlapping elongated baffle 1130. The entrances form a passageways configured to permit the liquid to flow from the first mixing zone 1180 to the second mixing zone 1185. The entrances form a passageways configured to permit the liquid to flow from the first mixing zone to the second mixing zone.

A cap 1150 is disposed over and about the first cylindrical weir 1165 thereby forming a third mixing zone 1187. The third mixing zone 1187, including an annular passageway between the outer surface of the first cylindrical weir 1165 and the inner surface of the cap 1150. Cap 1150 has a plurality of slots (or other shaped openings) substantially symmetrically disposed about the circumference of its open end. The slots begin at a lower extremity and are disposed substantially vertically up a portion of the cap 1150. The slots are configured for allowing passage of gas from the second mixing zone to the third mixing zone 1187.

The distributor assembly 1120 includes a plurality of semi-spiral-shaped baffles 1155 fixably disposed in the third mixing zone. The semi-spiral-shaped baffles 1155 having an elongated shape, are fixably disposed as such by any conventional method, e.g., having one lateral edge fixed to an inner surface of the cap 1150 or having an opposite lateral edge fixed to an outer surface of the first cylindrical weir 1165. They also have one longitudinal end disposed proximal to a bottom portion of the first cylindrical weir 1165 but above a top portion of the slots in the cap 1150. Semi-spiral-shaped baffles 1155 have an opposite longitudinal end disposed proximal to a top portion of the first cylindrical weir 1165. They are configured for causing the liquid and gas in the third mixing zone to move laterally and for causing further mixing of the liquid and gas.

A substantially doughnut-shaped screen member 1170 is disposed over a top portion of the first cylindrical weir 1165 and is configured for causing further liquid-liquid mixing and for causing separation of the liquid and the gas as fluid leaves the fourth mixing zone. A fourth mixing zone 1188 is thus formed having an annular shape and bounded on the top by the inner top surface of the cap 1150, on the bottom by the substantially doughnut-shaped screen member 1170, and has the width of the inner and outer diameters of the doughnut-shaped screen member 1170. The inner diameter of said substantially doughnut-shaped screen member is sufficient to achieve significant gas/liquid separation. In one embodiment, that inner diameter is from about 10% to about 75% of the diameter of said first cylindrical weir. Other variations on the figurations of the screen member are included in the invention.

There is optionally a plurality of fourth-mixing-zone baffles 1160 fixably attached to a top surface of the doughnut-shaped screen member 1170. The fourth-mixing-zone baffles 1160 are configured for diverting the liquid and the gas, and for causing further mixing of the liquid and gas.

An optional second cylindrical weir 1175 is centrally disposed about the outlet in the collection plate 1125 and disposed within the first cylindrical weir 1165 and having a smaller diameter and smaller height than the first cylindrical weir 1165, thereby forming a fifth mixing zone 1189. Fifth mixing zone 1189 has an annular shape bounded on the bottom optionally by the collection plate 1125, on an outer side by an inner surface of the first cylindrical weir 1165, and on the inner side by an outer surface of the second cylindrical weir 1175. The fifth mixing zone 1189 is configured to receive liquid from the fourth mixing zone 1188 for causing the liquid from the fourth mixing zone 1188 to further mix before the liquid flows over the top edge of the second cylindrical weir 1175 towards the lower catalyst bed 1108. Alternatively to being bounded on the bottom by the collection plate 1125, fifth mixing zone is bounded optionally on the bottom by a doughnut-shaped bottom panel elevated above the collection plate 1125, thus forming an annular basket shape.

Figure 3:
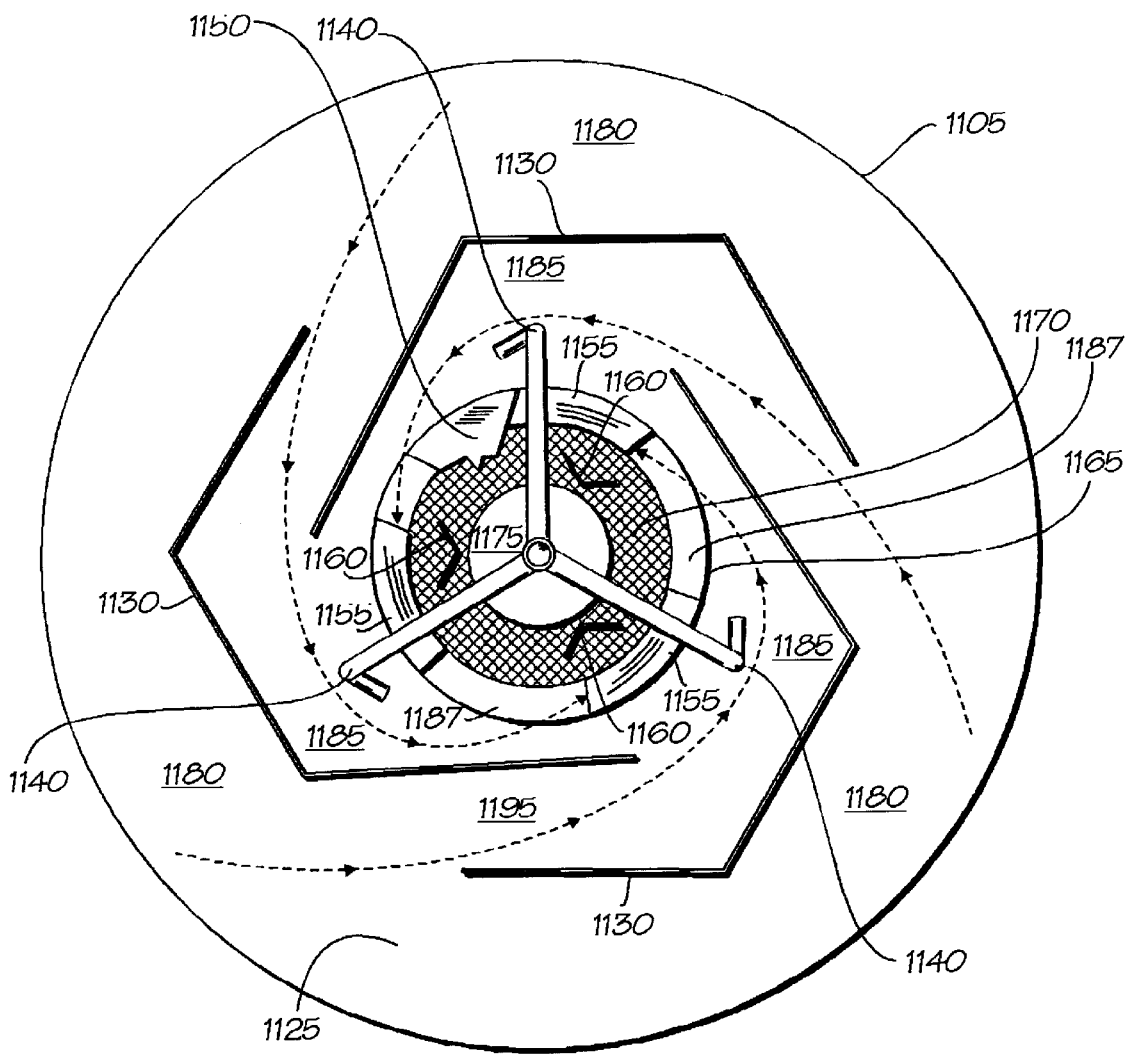
FIG. 3 is a top plan view of the preferred embodiment of the distributor assembly according to the present invention.
Figure 4:
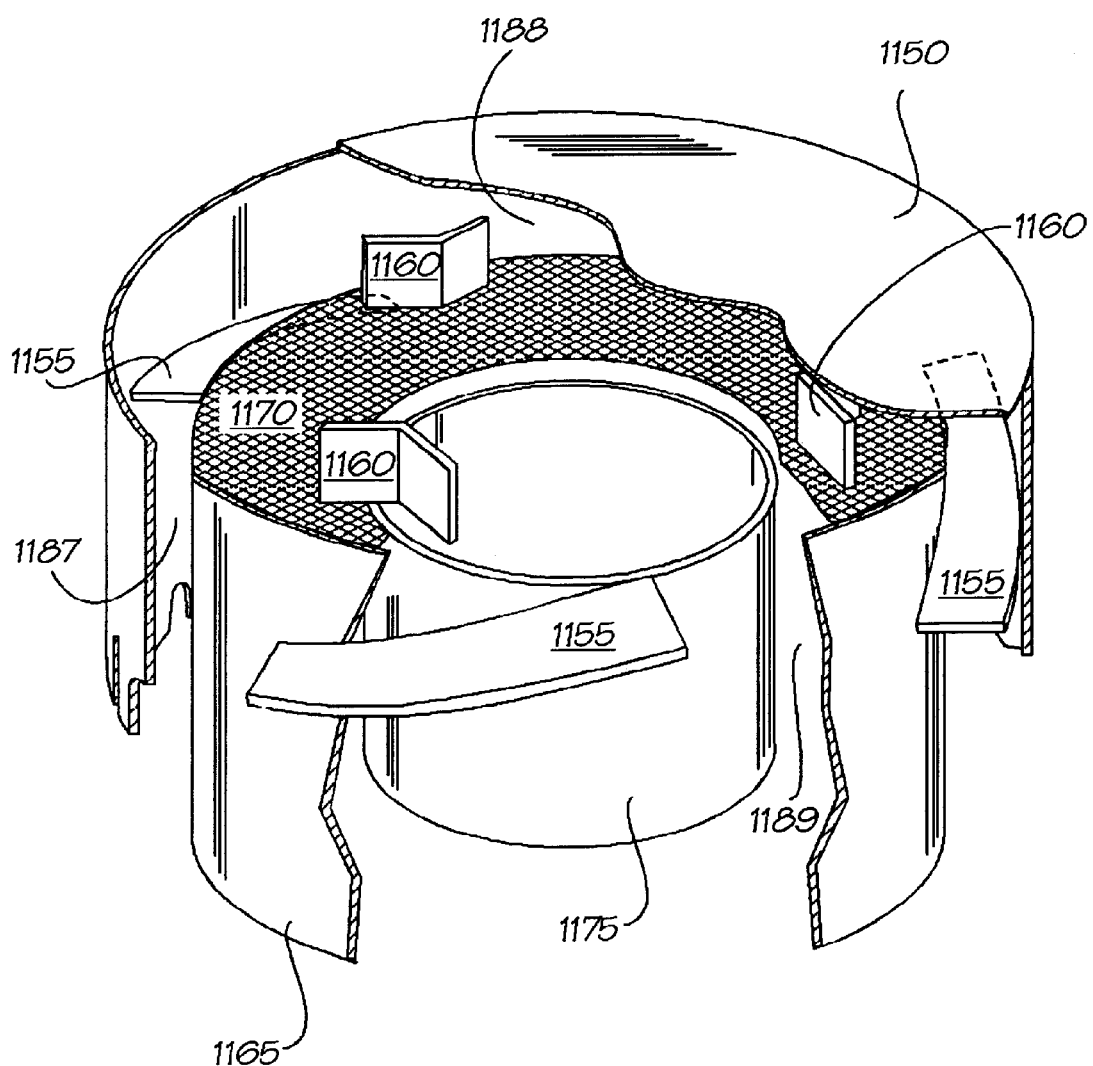
FIG. 4 is a top plan view of a preferred embodiment of the cap and weir portions of the distributor assembly according to the present invention.
Figure 5:
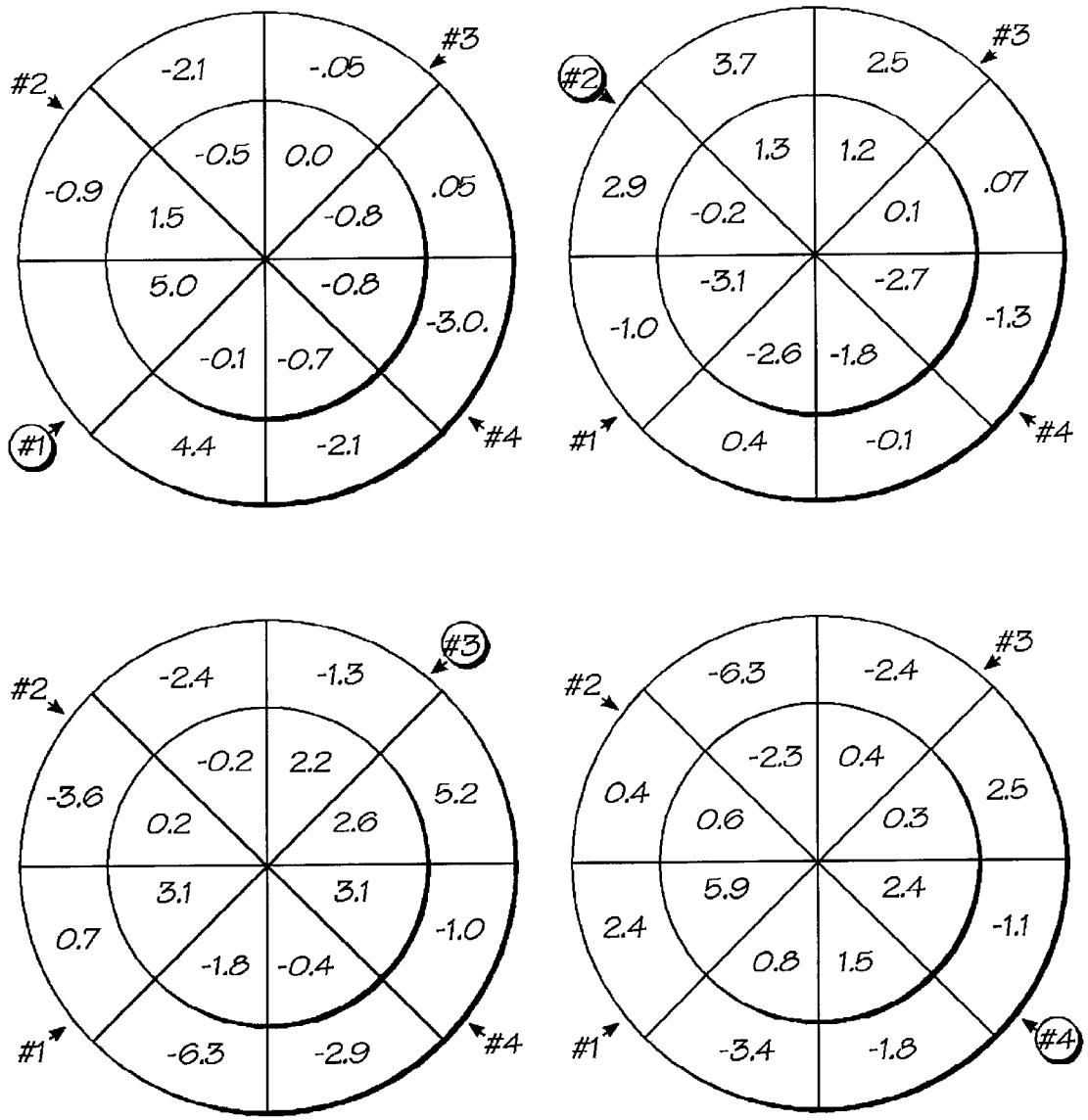
FIG. 5 depicts the performance of the invention in correcting liquid concentration maldistributions by showing the concentrations of a tracer liquid in various zones of the effluent from the distributor assembly.

Given the elements and arrangement of the elements as disclosed herein, one skilled in the art is capable of choosing the dimensions for each element appropriate for the internal diameter of the reactor for which any particular embodiment of the invention is intended. FIG. 3 is a top view schematic perspective of distributor assembly 1120. The above description for FIG. 2 also describes the elements in FIG. 3. FIG. 4 is top cut-away view of the cap 1150, first cylindrical weir 1165, and second cylindrical weir 1175. As shown, each of those three elements, respectively, has a progressively smaller diameter. FIG. 5 depicts experimental results and is discussed in that section below.

C. Advantages of the Invention

The benefits of the invention include, but are not limited to, low liquid holdup; good mixing, especially gas-liquid mixing, on the collection plate; low pressure drop, and relatively short overall height. The space-saving compact design is a major benefit since some conventional designs require as much as 4–5 ft. between the catalyst beds to install the conventional distributor assemblies (including conventional bubble cap tray and perforated plate). The invention only requires less than about 4 ft., preferably less than about 3 ft., and more preferably less than about 2 ft. between the catalyst beds to install the distributor assembly of the invention. Such space saving translates to large cost savings since the overall reactor height can be shorter and in retrofits of existing reactors, the catalyst beds need not be made smaller to make room for the distributor assembly.

VI. PREFERRED EMBODIMENTS AND EXAMPLES OF USE OF THE INVENTION

As liquid rains down from higher catalyst bed 1107 at various locations into the first mixing zone 1180, see, e.g., FIG. 2, the circular flow pattern in the horizontal plane of the first mixing zone 1180 induces mixing of the liquid in the pool with that liquid raining down. Thus, the liquid entering the second mixing zone 1185 has a relatively improved uniformity of temperature and composition distribution.

The size of the inlet passageways 1195, particularly, the width and height of the downstream end thereof is selected in view of the operating range of flow rate of liquid through the reactor 1100. Passageways 1195 optionally are constricted for restricting the flow of liquid from the first mixing zone to toward the second mixing zone 1185. This is to cause liquid to accumulate in the first mixing zone 1180 and that also, by virtue of the constriction of the flow and expansion downstream thereof imparts some turbulence to the liquid and gas stream exiting therefrom. The restriction should not be too great, however, lest the liquid overflow the baffles 1130.

As may be seen in FIGS. 2 and 3, the inlet passageways 1195 to the second mixing zone 1185 extend along a path that is radially offset from the axis of the reactor wall 1105 and that is also tangential to the circular outlet in the collection plate 1125. This orientation relative to the outlet, together with the annular shape of the flow passageway within the second mixing zone 1185, optionally imparts a rotating or spiraling flow pattern to the liquid that is additive to the rotating or circular flow pattern generated within the first mixing zone 1180. Also, the inlet passageways 1195 is optionally tapered or converges in the direction of flow of liquid from the first mixing zone into the second mixing zone 1185, to thereby induce some turbulence in the flow as the liquid flows through the constricted downstream end of the inlet passageway into the second mixing zone 1185. The restriction should not be too great, however, lest the liquid overflow the baffles 1130.

In certain hydrocarbon processing applications (for example, hydrodesulfurization), quench gas is injected through quench gas ports into the liquid and gas being processed. Quench gas may be injected to control the temperature and also the composition of the liquid and gas mixture (e.g., to provide hydrogen excess) that is distributed across the underlying catalyst bed. In the preferred embodiment shown in FIGS. 1 through 5, quench fluid or gas (for example, hydrogen) is injected at a plurality of points into the liquid by, e.g., quench gas ports 1140. A plurality of quench gas ports 1140 are optionally disposed in the second mixing zone. Each quench gas port 1140 has an outlet disposed proximal to the collection plate and configured for ejecting a quench gas beneath the surface of the liquid in the second mixing zone 1185 and towards the tail portion of each of the generally arc-shaped elongated baffles 1130.

The operating liquid level is lower than the height of the baffles 1130. Quench gas injection at such locations along the circular flow path in the second mixing zone 1185 causes agitation of the pool of liquid at each location, to thereby enhance the mixing of liquid falling into and flowing through the second mixing zone 1185.

Gas passes through the slots in cap 1150 at high velocity. The gas carries entrained liquid upward toward the top of first cylindrical weir 1165. The path of the upward flowing liquid and gas is redirected laterally by semi-spiral-shaped baffles 1155. Upon reaching the top of first cylindrical weir 1150, the liquid and gas moves toward the center of collection plate 1125. There is at least some gas-liquid separation due to the density difference between the phases. The fallen liquid passes through doughnut-shaped screen member 1170 and into fifth mixing zone 1189. The gas continues and passes through the outlet in the collection plate 1125. The liquid in fifth mixing zone 1189 eventually rises up and over the top edge of second cylindrical weir 1175 and also passes through outlet in the collection plate 1125.

In the preferred embodiment, the liquid and gas, as well as quench gas, exiting from the outlet of the collection plate 1125 is directed to the center of a perforated, flat, perforated plate 1115 that is mounted below the collection plate 1125. The plate 1115 has a large number of apertures therein (only some of which are shown for sake of clarity). A bubble cap assembly 1110 is mounted under the plate 1115 to receive liquid and gas from the perforated collector plate and distribute the liquid and gas mixture across the underlying catalyst bed.

Further liquid mixing and liquid-gas entrainment is provided by the combination of the perforated plate and bubble cap assembly. Such bubble cap assembly 1110 may be of the type generally described in U.S. Pat. No. 4,836,989, the contents of which is incorporated by reference. The assembly includes a plate mounted under plate 1115 and a large number of tubes which project upwardly from the plate and cap mounted at the upper ends of the tubes. Slots are formed at the lower ends of the caps to provide passageways for gas and liquid. The distribution of the tubes over the cross section of the plate provides for even distribution of the liquid and gas mixture over the underlying catalyst bed. It is preferred that the several distributor assemblies 1120 be oriented within the reactor 1100, one between each two catalyst beds.

The distributor assembly of the invention provides for substantial liquid-liquid, gas-liquid, and gas-gas mixing directly on the collection plate 1125. This provides better mixing than the staged approach used in some known devices of first having only liquid-liquid and gas-gas mixing on the collection tray, then having gas-liquid mixing on the bubble cap assembly below. The semi-spiral-shaped baffles also contribute to substantial gas-liquid and gas-gas mixing. This mixing occurs in mixing zone 3, the annular space between the cap and the first cylindrical weir. The quench gas ports additionally contribute to substantial gas-liquid mixing.

Obtaining good mixing characteristics requires taking into account the following parameters, among others: intensity of local turbulence, length of flow path, and overall contact time. The distributor assembly 1120 of the invention addresses each of these parameters in a unique way which obtains synergistic results. Intense local mixing on the collection plate 1125 is provided by the gas as it lifts the liquid up the first cylindrical weir 1165 and by the jetting quench gas in the vicinity of the cap 1150 and first cylindrical weir 1165. The length of the flow path is increased by the baffle arrangement of generally arc-shaped elongated baffles 1130 on the collection plate 1125 and by the circulatory motion of the liquid phase caused by the quench gas ports 1140. The overall contact time is augmented in this invention by addition of the optional second cylindrical weir 1175.

The previous description of a preferred embodiment of the present invention is primarily for illustrative purposes, it being recognized that a number of variations might be used which would still incorporate the essence of the invention. Accordingly, reference should be made to the claims below in determining the scope of the invention.

VII. EXPERIMENTAL RESULTS

A. Configuration

A large scale size model of the distributor assembly of the invention was constructed and its performance for correcting gas and liquid maldistributions was tested. It was fixably attached to a cylindrical large scale model of a section of a catalytic reactor having a diameter of 6 ft. and a height of 7 ft. The approximate dimensions of the tested embodiment of the invention were as shown in Table 3 which follows:

TABLE 3

| Element Name | Element Number Used In Figures | Approx. Dimensions Used in Experiment |
|---|---|---|
| Reactor | 1100 | 6 ft. O.D. |
| Reactor Side Wall | 1105 | 7 ft. Height |
| First Mounting Means | 1106 | Grid Bars |
| Catalyst Beds | 1107, 1108 | 6 in. Height |
| Bubble Cap Tray Assembly | 1110 | 6 ft. Diameter |
| Perforated Plate | 1115 | 6 ft. Diameter |
| Second Mounting Means | 1117 | None |
| Distributor Assembly | 1120 | 18 in. Height |
| Distance from bottom of Collection plate 1125 to top of Cap 1150 | | 8 in. Height |
| Generally Arc-Shaped Elongated Baffles | 1130 | 62 in. Length |
| Quench Gas Ports | 1140 | 0.5 in. Diameter |
| Cap | 1150 | 24 in. Diameter |
| Semi-Spiral-Shaped Baffles | 1155 | 11 in. Length |

TABLE 3-continued

| Element Name | Element Number Used In Figures | Approx. Dimensions Used in Experiment |
|---|---|---|
| Fourth-mixing-zone baffles | 1160 | 6 in. Total Length |
| First Cylindrical Weir | 1165 | 18 in. Diameter |
| Doughnut-shaped Screen Member | 1170 | 176 in.$^2$ Area |
| Second Cylindrical Weir | 1175 | 5 in. Diameter |

B. Methodology

In one test, a non-reactive liquid tracer was injected in one of four test ports on the perimeter of the simulated catalyst bed above the distributor assembly. The tracer element acted as a simulated temperature and concentration variation. Water was the diluent acting as simulated reactor primary feed.

The water and tracer passed through the distributor assembly. The effluent was collected below the distributor assembly, then through conventional perforated tray and then through a bubble cap distribution tray. The effluent from the bubble cap distribution tray was collected in 16 equally-sized geometrically divided zones. The concentration of the tracer in each zone was determined using electroconductivity measurements.

C. Results

FIG. 5 depicts the performance of the invention in correcting liquid concentration maldistributions by showing the concentrations of a tracer liquid in various zones of the effluent from the distributor assembly. The numbers shown in each zone in FIG. 5 indicate the standard deviation from the mean concentration of the tracer across zones. The results show the deviations are random and small thus indicating good liquid/liquid mixing.

What is claimed is:

1. A multi-bed downflow catalytic reactor comprising:
   (a) a cylindrical reactor wall;
   (b) at least one mounting means fixably attached to said cylindrical reactor wall;
   (c) two or more catalyst beds fixably attached to said mounting means and disposed between inner surfaces of said cylindrical reactor wall, said catalyst beds being vertically superimposed in relation to each other to permit liquid and gas to flow from a higher catalyst bed to a lower catalyst bed;
   (d) a distributor assembly fixably attached to said mounting means and disposed between inner surfaces of said cylindrical reactor wall and between said catalyst beds and comprising:
   (1) a collection plate disposed substantially horizontally between said cylindrical reactor wall, configured for collecting liquid flowing down from said higher catalyst bed; said collection plate having of an outlet in a center portion thereof configured for allowing a passageway for liquid and gas from said higher catalyst bed to flow toward said lower catalyst bed;
   (2) from about 2 to about 6 generally arc-shaped elongated baffles:
      (a) disposed in a staggered, substantially symmetrical pattern about said collection plate,
      (b) each arc-shaped elongated baffle having a bottom edge portion fixably attached to said collection plate and a top edge portion extending substantially vertically upward to a height sufficient to substantially prevent liquid flowing over said edge portion;
      (c) each arc-shaped elongated baffle having a head portion proximal to said cylindrical reactor wall and having an opposite tail portion proximal to a center portion of said collection plate, wherein said head portion of each arc-shaped elongated baffle proximal to perimeter portions of said collection plate is a distance of from about 5% to about 40% of the radius of said collection plate to the perimeter of said collection plate; and said opposite tail portion proximal to a center portion of said collection plate is a distance of from about 5% to about 40% of the radius of said collection plate to the center of said collection plate;
      (d) wherein said head portion of each of said arc-shaped elongated baffles overlaps a tail portion of another of said elongated baffles, and
      (e) said arc-shaped elongated baffles configured for directing said liquid from an outer portion of said collection plate toward a center portion of said collection plate and configured to cause mixing between liquid passing out of the tail portion of each arc-shaped elongated baffle with the liquid passing into the head portion of the adjacent overlapping arc-shaped elongated baffle;
   (3) a first mixing zone bounded on the bottom by said collection plate, on one side by said cylindrical reactor wall, on the opposite side by an outer surface of said arc-shaped elongated baffles;
   (4) a first cylindrical weir fixably attached to said collection plate about said outlet, configured for causing said liquid and gas to rise up and over said first cylindrical weir before flowing through said outlet toward the lower catalyst bed;
   (5) a second mixing zone:
      (a) bounded on the bottom by said collection plate, on one side by an outer surface of a cap and said first cylindrical weir, and on the opposite side by an inner surface of said arc-shaped elongated baffles;
      (b) having a plurality of entrances bound on one side by the interior surface of a head portion of one arc-shaped elongated baffle and on an opposite side by the outer surface of a tail portion of an overlapping arc-shaped elongated baffle; and
      (c) wherein said entrances form passageways configured to permit said liquid to flow from said first mixing zone to said second mixing zone;
   (6) a cap disposed over and about said first cylindrical weir:
      (a) thereby forming a third mixing zone, comprising an annular passageway between an outer surface of said first cylindrical weir and an inner surface of said cap; and
      (b) said cap having a plurality of slots substantially symmetrically disposed about the circumference of its open end; beginning at a lower extremity and disposed substantially vertically up a portion of said cap; configured for allowing passage of gas and liquid from said second mixing zone to said third mixing zone;
   (7) from about 2 to about 6 semi-spiral-shaped baffles fixably disposed in said third mixing zone, said semi-spiral-shaped baffles having a elongated shape, having one lateral edge fixed to an inner surface of said cap or an opposite lateral edge fixed to an outer surface of said first cylindrical weir, and having one longitudinal end disposed proximal to a bottom portion of said first cylindrical weir but above a top portion of said slots in said cap; and having an opposite longitudinal end disposed proximal to a top portion of said first cylindrical weir, configured for causing said liquid and gas in said third mixing zone to move laterally and for causing further mixing of said liquid and gas;

(8) a substantially doughnut-shaped screen member disposed over a top portion of said first cylindrical weir, thereby forming a fourth mixing zone bounded on the top by the cap, on the bottom by the Substantially doughnut-shaped screen member, an having the width of the inner and outer diameter of the doughnut-shaped screen member, said fourth mixing zone configured for causing further liquid-liquid mixing and for causing separation of said liquid and said gas, and wherein the inner diameter of said substantially doughnut-shaped screen member is from about 10% to about 75% of the diameter of said first cylindrical weir;

(9) from about 2 to about 6 fourth-mixing-zone baffles fixably attached to a top surface of said doughnut-shaped screen member, configured for diverting said liquid and said gas, and for causing further mixing of said liquid and gas;

(10) a second cylindrical weir centrally disposed about said outlet in said collection plate and disposed within said first cylindrical weir and having a smaller diameter and smaller height than said first cylindrical weir, thereby forming a fifth mixing zone having an annular shape bounded on the bottom by said collection plate, on an outer side by an inner surface of said first cylindrical weir, and on the inner side by an outer surface of said second cylindrical weir, said fifth mixing zone configured to receive liquid from said fourth mixing zone for causing said liquid from said third mixing zone to further mix before said liquid flows over the top edge of said second cylindrical weir towards the lower catalyst bed; and

(11) from about 2 to about 6 quench gas ports disposed in said second mixing zone; each port having an outlet disposed proximal to said collection plate and configured for ejecting a quench gas beneath the surface of said liquid in said second mixing zone and towards said tail portion of each of said generally arc-shaped elongated baffles.

2. A distributor assembly for a multi-bed, downflow catalytic reactor comprising:

(a) a collection plate configured for substantially horizontally disposal between the walls of a cylindrical reactor, configured for collecting liquid flowing down from a higher catalyst bed contained in said reactor; said collection plate having of an outlet in a center portion thereof configured for allowing a passageway for liquid and gas from said higher catalyst bed to flow toward a lower catalyst bed contained in said reactor;

(b) a plurality of generally arc-shaped elongated baffles:
  (1) disposed in a staggered, substantially symmetrical pattern about said collection plate;
  (2) each arc-shaped elongated baffle having a bottom edge portion fixably attached to said collection plate and a top edge portion extending substantially vertically upward to a height sufficient to substantially prevent liquid flowing over said top edge portion;
  (3) each arc-shaped elongated baffle having a head portion proximal to perimeter portions of said collection plate and having an opposite tail portion proximal to a center portion of said collection plate;
  (4) wherein said head portion of each of said arc-shaped elongated baffles overlaps a tail portion of another of said arc-shaped elongated baffles; and
  (5) said arc-shaped elongated baffles configured for directing said liquid from an outer portion of said collection plate toward a center portion of said collection plate and configured to cause mixing between liquid passing out of the tail portion of each arc-shaped elongated baffle with the liquid passing into the head portion of the adjacent overlapping arc-shaped elongated baffle;

(c) a first mixing zone configured to be bounded on the bottom by said collection plate, on one side by a wall of said cylindrical reactor, on the opposite side by an outer surface of said arc-shaped elongated baffles, (d) a cylindrical weir fixably attached to said collection plate about said outlet, configured for causing said liquid and gas to rise up and over said first cylindrical weir before lowing through said outlet toward the lower catalyst bed;

(e) a second mixing zone:
  (1) bounded on the bottom by said collection plate, on one side by an outer surface of a cap and said first cylindrical weir, and on the opposite side by an inner surface of said arc-shaped elongated baffles;
  (2) having a plurality of entrances bound on one side by the interior surface of a head portion of one elongated baffle and on an opposite side by the outer surface of a tail portion of an overlapping arc-shaped elongated baffle; and
  (3) wherein said entrances form a passageways configured to permit said liquid to flow from said first mixing zone to said second mixing zone;

(f) a cap disposed over and about said first cylindrical weir:
  (1) thereby forming a third mixing zone, comprising an annular passageway between an outer surface of said first cylindrical weir and an inner surface of said cap; and
  (2) said cap having a plurality of slots substantially symmetrically disposed about the circumference of its open end; beginning at a lower extremity and disposed substantially vertically up a portion of said cap; configured for allowing passage of gas from said second mixing zone to said third mixing zone;

(g) a substantially doughnut-shaped screen member disposed over a top portion of said first cylindrical weir, configured for causing further liquid-liquid mixing and for causing separation of said liquid and said gas;

(h) a plurality of fourth-mixing-zone baffles fixably attached to a top surface of said doughnut-shaped screen member, configured for diverting said liquid and said gas, and for causing firer mixing of said liquid and gas; and (i) said distributor assembly configured with a means for disposal and fixable attachment between inner surfaces of the walls of a multi-bed downflow cylindrical reactor wall and with a means for disposal between vertically stacked catalyst beds within said reactor.

3. The distributor assembly of claim 2, further comprising a plurality of semi-spiral-shaped baffles fixably disposed in said third mixing zone, said semi-spiral-shaped baffles having a elongated shape, having one lateral edge fixed to an inner surface of said cap or an opposite lateral edge fixed to an outer surface of said first cylindrical weir, and having one longitudinal end disposed proximal to a bottom portion of said first cylindrical weir but above a top portion of said slots in said cap; and having an opposite longitudinal end disposed proximal to a top portion of said first cylindrical weir, configured for causing said liquid and gas in said third mixing zone to move laterally and for causing further mixing of said liquid and gas.

4. The distributor assembly of claim 2, further comprising a second cylindrical weir centrally disposed about said outlet in said collection plate and disposed within said first cylindrical weir and having a smaller diameter and smaller height than said first cylindrical weir, thereby forming a fifth mixing zone having an annular shape bounded on the bottom by said collection plate, on an outer side by an inner surface of said first cylindrical weir, and on the inner side by an outer surface of said second cylindrical weir, said fifth mixing zone configured to receive liquid from said fourth mixing zone for causing said liquid from said third mixing zone to further mix before said liquid flows over the top edge of said second cylindrical weir towards the lower catalyst bed.

5. The distributor assembly of claim 2, further comprising a plurality of quench gas ports disposed in said second mixing zone; each port having an outlet disposed proximal to said collection plate and configured for ejecting a quench gas beneath the surface of said liquid in said second mixing zone and towards said tail portion of each of said generally arc-shaped elongated baffles.

6. The distributor assembly of claim 2 wherein said plurality of generally arc-shaped elongated baffles is from about 2 to about 6.

7. The distributor assembly of claim 2 wherein:
(a) said head portion of each arc-shaped elongated baffle proximal to perimeter portions of said collection plate is a distance of from about 5% to about 40% of the radius of said collection plate to the perimeter of said collection plate; and
(b) and said opposite tail portion of each arc-shaped elongated baffle proximal to a center portion of said collection plate is a distance of from about 5% to about 40% of the radius of said collection plate to the center of said collection plate.

8. The distributor assembly of claim 2 wherein said plurality of fourth-mixing-zone baffles is from about 2 to about 6.

9. The distributor assembly of claim 3, wherein said plurality of semi-spiral-shaped baffles is from about 2 to about 6.

10. The distributor assembly of claim 2 wherein the inner diameter of said substantially doughnut-shaped screen member is from about 10% to about 75% of the diameter of said first cylindrical weir.

11. The distributor assembly of claim 2, further comprising a perforated plate disposed beneath said collection plate, and comprising a bubble cap tray assembly disposed beneath said perforated plate.

12. The distributor assembly of claim 11, wherein the distance from the bottom of said bubble cap tray assembly to the top of said cap of claim 2 subpart (f) is not greater than about 4 ft.

13. The distributor assembly of claim 11, wherein the distance from the bottom of said bubble cap tray assembly to the top of said cap of claim 2 subpart (f) is not greater than about 3 ft.

14. The distributor assembly of claim 11, wherein the distance from the bottom of said bubble cap tray assembly to the top of said cap of claim 2 subpart (f) is not greater than about 2 ft.

15. A multi-bed, downflow catalytic reactor comprising:
(a) a cylindrical reactor wall;
(b) at least one mounting means fixably attached to said cylindrical reactor wall;
(c) two or more catalyst beds fixably attached to said mounting means and disposed between inner surfaces of said cylindrical reactor wall, said catalyst beds being vertically superimposed in relation to each other to permit liquid and gas to flow from a higher catalyst bed to a lower catalyst bed; and
(d) a distributor assembly fixably attached to said mounting means and disposed between inner surfaces of said cylindrical reactor wall and between said catalyst beds and comprising:
  (1) a collection plate disposed substantially horizontally between said cylindrical reactor wall, configured for collecting liquid flowing down from said higher catalyst bed; said collection plate having of an outlet in a center portion thereof configured for allowing a passageway for liquid and gas from said higher catalyst bed to flow toward said lower catalyst bed;
  (2) a plurality of generally arc-shaped elongated baffles:
    (a) disposed in a staggered, substantially symmetrical pattern about said collection plate;
    (b) each arc-shaped elongated baffle having a bottom edge portion fixably attached to said collection plate and a top edge portion extending substantially vertically upward to a height sufficient to substantially prevent liquid flowing over said top edge portion;
    (c) each arc-shaped elongated baffle having a head portion proximal to said cylindrical reactor wall and having an opposite tail portion proximal to a center portion of said collection plate;
    (d) wherein said head portion of each of said arc-shaped elongated baffles overlaps a tail portion of another of said arc-shaped elongated baffles; and
    (e) said arc-shaped elongated baffles configured for directing said liquid from an outer portion of said collection plate toward a center portion of said collection plate and configured to cause mixing between liquid passing out of the tail portion of each arc-shaped elongated baffle with the liquid passing into the head portion of the adjacent overlapping arc-shaped elongated baffle;
  (3) a first mixing zone bounded on the bottom by said collection plate, on one side by said cylindrical reactor wall, on the opposite side by an outer surface of said arc-shaped elongated baffles,
  (4) a first cylindrical weir fixably attached to said collection plate about said outlet, configured for causing said liquid and gas to rise up and over said first cylindrical weir before flowing through said outlet toward the lower catalyst bed;
  (5) a second mixing zone:
    (a) bounded on the bottom by said collection plate, on one side by an outer surface of a cap and said first cylindrical weir, and on the opposite side by an inner surface of said arc-shaped elongated baffles;
    (b) having a plurality of entrances bound on one side by the interior surface of a head portion of one arc-shaped elongated baffle and on an opposite side by the outer surface of a tail portion of an overlapping arc-shaped elongated baffle; and (c) wherein said entrances form passageways configured to permit said liquid to flow from said first mixing zone to said second mixing zone, (6) a cap disposed over and about said first cylindrical weir:
   (a) thereby forming a third mixing zone, comprising an annular passageway between an outer surface of said first cylindrical weir and an inner surface of said cap; and
   (b) said cap having a plurality of slots substantially symmetrically disposed about the circumference of its open end; begining at a lower extremity and disposed substantially vertically up a portion of said cap; configured for allowing passage of gas and liquid from said second mixing zone to said third mixing zone;

(7) a plurality of semi-spiral-shaped baffles fixably disposed in said third mixing zone, said semi-spiral-shaped baffles having a elongated shape, having one lateral edge fixed to an inner surface of said cap or an opposite lateral edge fixed to an outer surface of said first cylindrical weir, and having one longitudinal end disposed proximal to a bottom portion of said first cylindrical weir but above a top portion of said slots in said cap; and having an opposite longitudinal end disposed proximal to a top portion of said first cylindrical weir, configured for causing said liquid and gas in said third mixing zone to move laterally and for causing further mixing of said liquid and gas;

(8) a substantially doughnut-shaped screen member disposed over a top portion of said first cylindrical weir, thereby forming a fourth mixing zone bounded on the top by the cap, on the bottom by the substantially doughnut-shaped screen member, an having the width of the inner and outer diameter of the doughnut-shaped screen member, said fourth mixing zone configured for causing further liquid-liquid mixing and for causing separation of said liquid and said gas;

(9) a plurality of fourth-mixing-zone baffles fixably attached to a top surface of said doughnut-shaped screen member, configured for diverting said liquid and said gas, and for causing further mixing of said liquid and gas;

(10) a second cylindrical weir centrally disposed about said outlet in said collection plate and disposed within said first cylindrical weir and having a smaller diameter and smaller height than said first cylindrical weir, thereby forming a fifth mixing zone having an annular shape bounded on the bottom by said collection plate, on an outer side by an inner surface of said first cylindrical weir, and on the inner side by an outer surface of said second cylindrical weir, said fifth mixing zone configured to receive liquid from said fourth mixing zone for causing said liquid from said third mixing zone to further mix before said liquid flows over the top edge of said second cylindrical weir towards the lower catalyst bed; and

(11) a plurality of quench gas ports disposed in said second mixing zone; each port having an outlet disposed proximal to said collection plate and configured for ejecting a quench gas beneath the surface of said liquid in said second mixing zone and towards said tail portion of each of said generally arc-shaped elongated baffles.

16. The reactor of claim 15, further comprising a perforated plate disposed beneath said collection plate, and comprising a bubble cap tray assembly disposed beneath said perforated plate.

17. The reactor of claim 16, wherein the distance from the bottom of said bubble cap tray assembly to the top of said cap of claim 16 subpart (d)(6) is not greater than about 4 ft.

18. The reactor of claim 16, wherein the distance from the bottom of said bubble cap tray assembly to the top of said cap of claim 16 subpart (d)(6) is not greater than about 3 ft.

19. The reactor of claim 16, wherein the distance from the bottom of said bubble cap tray assembly to the top of said cap of claim 16 subpart (d)(6) is not greater than about 2 ft.

20. The reactor of claim 15, wherein said second cylindrical weir is fixably attached to the same mounting means as the higher catalyst bed.

21. The reactor of claim 15, wherein said plurality of generally arc-shaped elongated baffles is from about 2 to about 6.

22. The reactor of claim 15, wherein:
   (a) said head portion of each arc-shaped elongated baffle proximal to perimeter portions of said collection plate is a distance of from about 5% to about 40% of the radius of said collection plate to the perimeter of said collection plate; and
   (b) and said opposite tail portion proximal to a center portion of said collection plate is a distance of from about 5% to about 40% of the radius of said collection plate to the center of said collection plate.

23. The reactor of claim 15, wherein said plurality of fourth-mixing-zone baffles is from about 2 to about 6.

24. The reactor of claim 15, wherein said plurality semi-spiral-shaped baffles is from about 2 to about 6.

25. The reactor of claim 15, wherein the inner diameter of said substantially doughnut-shaped screen member is from about 10% to about 75% of the diameter of said first cylindrical weir.

* * * * *